(12) United States Patent
Zhang

(10) Patent No.: US 9,091,538 B2
(45) Date of Patent: Jul. 28, 2015

(54) LASER LANDING ALTIMETER FOR PRECISION AIRCRAFT LANDING AID

(71) Applicant: ChengDu HaiCun IP Technology LLC, ChengDu (CN)

(72) Inventor: Guobiao Zhang, Corvallis, OR (US)

(73) Assignees: ChengDu HaiCun IP Technology LLC, ChengDu, SiChuan (CN); Guobiao Zhang, Corvallis, OR (US)

( * ) Notice: Subject to any disclaimer, the term of this patent is extended or adjusted under 35 U.S.C. 154(b) by 0 days.

(21) Appl. No.: 13/951,463

(22) Filed: Jul. 26, 2013

(65) Prior Publication Data
US 2014/0236400 A1    Aug. 21, 2014

Related U.S. Application Data

(60) Provisional application No. 61/766,686, filed on Feb. 19, 2013.

(51) Int. Cl.
*G01C 3/00* (2006.01)
*G01C 5/00* (2006.01)

(52) U.S. Cl.
CPC . *G01C 5/005* (2013.01); *G01C 3/00* (2013.01)

(58) Field of Classification Search
CPC ........ G01C 3/00; G01C 5/005; G05D 1/0676; G01S 17/933; G08G 5/02; B64C 13/18
USPC ........... 701/3–5, 16, 18; 703/2; 244/183, 186, 244/187
See application file for complete search history.

(56) References Cited

U.S. PATENT DOCUMENTS

| | | | |
|---|---|---|---|
| 3,589,648 A * | 6/1971 | Gorham et al. | 244/186 |
| 3,652,161 A | 3/1972 | Ross | |
| 4,196,346 A | 4/1980 | McElhannon | |
| 4,611,912 A | 9/1986 | Falk et al. | |
| 4,925,303 A | 5/1990 | Pusic | |
| 5,247,356 A * | 9/1993 | Ciampa | 348/144 |
| 5,309,212 A | 5/1994 | Clark | |
| 5,557,397 A * | 9/1996 | Hyde et al. | 356/5.01 |
| 5,680,208 A | 10/1997 | Butler et al. | |
| 5,903,345 A | 5/1999 | Butler et al. | |
| 5,982,299 A | 11/1999 | Shemwell | |
| 6,028,665 A | 2/2000 | McQueen | |
| 6,864,966 B2 | 3/2005 | Giger | |
| 7,095,488 B2 * | 8/2006 | Jamieson et al. | 356/5.01 |
| 7,106,424 B2 | 9/2006 | Meneely et al. | |
| 7,283,214 B2 | 10/2007 | Xu et al. | |
| 7,400,386 B2 | 7/2008 | Jamieson et al. | |
| 7,471,997 B2 * | 12/2008 | Tezuka | 701/16 |
| 7,693,617 B2 | 4/2010 | Dockter et al. | |
| 7,920,943 B2 * | 4/2011 | Campbell et al. | 701/9 |
| 8,019,490 B2 * | 9/2011 | Ferren et al. | 701/3 |
| 8,068,215 B2 | 11/2011 | Gogolla et al. | |
| 8,175,763 B2 * | 5/2012 | Yamane et al. | 701/16 |
| 8,179,521 B2 | 5/2012 | Valla et al. | |
| 8,265,807 B2 * | 9/2012 | Yamane et al. | 701/15 |
| 2005/0230564 A1 * | 10/2005 | Yamane | 244/183 |
| 2011/0264307 A1 * | 10/2011 | Guyette et al. | 701/3 |

\* cited by examiner

*Primary Examiner* — Russell Frejd

(57) ABSTRACT

The present invention discloses a laser landing altimeter for precision aircraft landing aid. Its measurement unit measures distance using a modulated laser beam with centimeter accuracy. Its processing unit predicts the future altitude based on a realistic landing altitude model and determines the landing maneuver time (the time to initiate a landing maneuver).

20 Claims, 6 Drawing Sheets

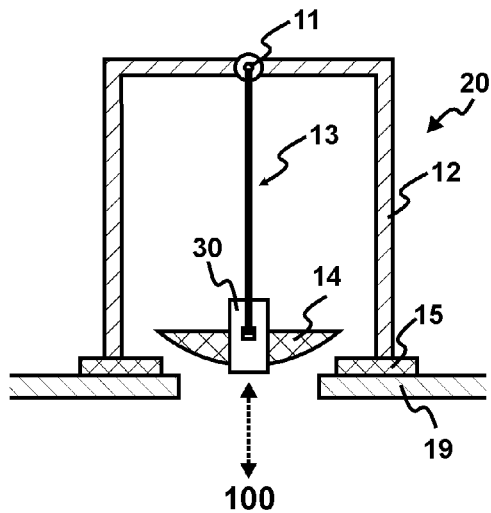
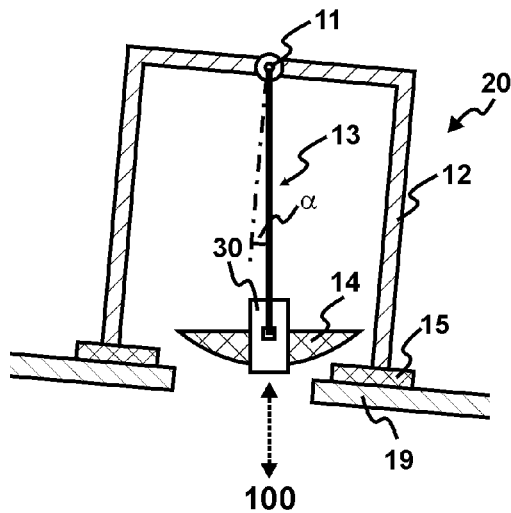
Fig. 8AA
Fig. 8AB
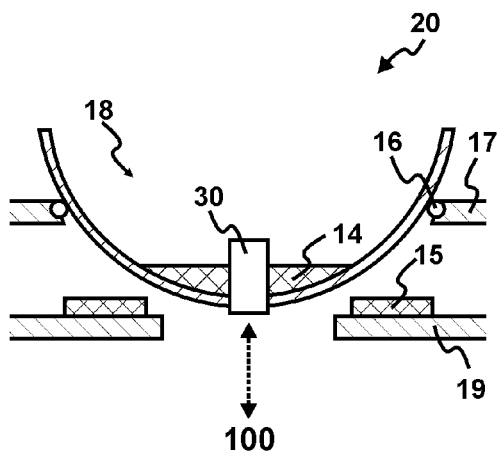
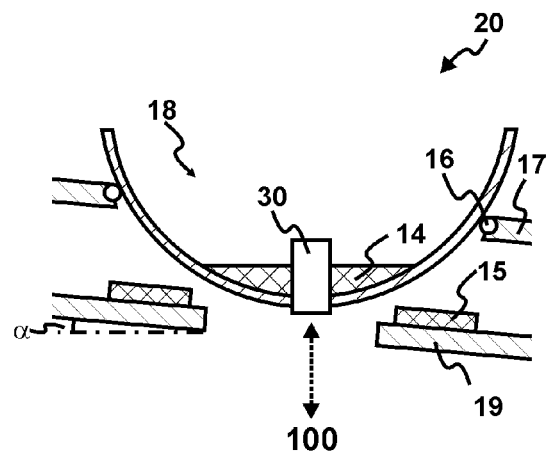
Fig. 8BA
Fig. 8BB

LASER LANDING ALTIMETER FOR PRECISION AIRCRAFT LANDING AID

CROSS-REFERENCE TO RELATED APPLICATIONS

This application claims priority of a provisional application entitled "Precision Aircraft Landing Aid", Ser. No. 61/766,686, filed Feb. 19, 2013.

BACKGROUND

1. Technical Field of the Invention

The present invention relates to a precision aircraft landing aid, more particularly to a laser landing altimeter.

2. Prior Arts

Landing is the most challenging part of flying. For light aircrafts, a normal landing consists of two maneuvers: flare and pre-touchdown. When the aircraft flies into the ground effect, a pilot initiates a first pitch change so that the aircraft flies level above the ground. As the aircraft loses speed and becomes sufficiently close to the ground, the pilot initiates a second pitch change to reduce the descent rate at touchdown. Hereinafter, the first pitch change is referred to as flare, the time and altitude to initiate flare are referred to as flare time and flare altitude, respectively. The second pitch change is referred to as pre-touchdown, and the time and altitude to initiate pre-touchdown are referred to as pre-touchdown time and pre-touchdown altitude, respectively. Overall, the flare time and pre-touchdown time are collectively referred to as landing maneuver time, while the flare altitude and pre-touchdown altitude are collectively referred to as landing maneuver altitude. The same definitions apply to both small and large aircrafts.

For small aircrafts, the flare altitude is typically ~5 m to ~10 m above ground level (AGL). Student pilots generally have difficulty judging the flare altitude and need to practice hundreds of landings before getting to know when to flare. Practicing such a large number of landings lengthens the training time, wastes a large amount of fuel and has a negative impact to the environment. Although a radio altimeter may be used to help flare, it is expensive. A low-cost landing aid is needed for student pilots to master landing skills quickly and with relative ease.

For small aircrafts, the pre-touchdown altitude is typically less than ~2 m AGL, preferably ~1 m AGL. It can tolerate much less error than the flare altitude. Most pilots, even experienced pilots, have difficulty judging the pre-touchdown altitude. Because a radio altimeter only has an accuracy of ±~1 m, it cannot be used to help pre-touchdown. In order to make a gentle touchdown, a precision landing aid is desired to precisely measure the altitude when the aircraft is near the ground, preferably with centimeter (cm) accuracy.

For large aircrafts, standard landing procedure teaches a single maneuver: flare. At the flare altitude, a pilot initiates a pitch change to reduce the descent rate and holds the flare pitch until the aircraft flies onto the runway. During flare, an intermediate descent rate (e.g. ~2 m/s) is recommended. However, this intermediate descent rate may cause disturbance to the passengers at touchdown. To improve passenger comfort, a certain degree of pre-touchdown maneuver is preferably performed to reduce the descent rate at touchdown. This requires a precision landing aid, which can precisely measure the aircraft altitude when the aircraft is near the ground, preferably with centimeter (cm) accuracy.

U.S. Pat. No. 7,106,424 issued to Meneely et al. on Sep. 12, 2006 and U.S. Pat. No. 7,400,386 issued to Jamieson et al. on Jul. 15, 2008 disclose a pulsed laser altimeter. It directly measures the time for a short laser pulse to travel from the laser source to a remote object and then back to the laser source, i.e. time-of-flight (TOF). The pulsed laser altimeter has a range of up to several kilometers (km) and an accuracy of ±~1 m. Similar to a radio altimeter, this accuracy is not good enough for precision landing aid.

U.S. Pat. No. 6,864,966 issued to Giger on Mar. 8, 2005, U.S. Pat. No. 5,309,212 issued to Clark on May 3, 1994 and U.S. Pat. No. 4,611,912 issued to Falk et al. on Sep. 16, 1986 disclose several laser distance meters (LDM). They measure distance using a modulated laser beam. The LDM has a range of tens of meters and an accuracy of millimeter (mm). To achieve the mm accuracy, an LDM statistically evaluates hundreds to thousands of distance data. The evaluation period T (i.e. the time it takes to generate a new distance reading) is long, with a typical value of ~0.1 s to ~7 s.

The LDM is designed to measure static distance, i.e. distance to a stationary (or, slow-moving) object. It is not designed to measure dynamic distance, i.e. distance to a fast-moving object. For a fast-moving object, the real-time distance is not as useful as the predicted future distance (e.g. the aircraft altitude at a future time). Unfortunately, the LDM does not have the capability to extract this information. Furthermore, it has a long evaluation period, which makes it virtually impossible to perform a meaningful distance measurement for a landing aircraft. As illustrated in FIG. 1, a landing aircraft has a speed of ~60 knots (~30 m/s) to ~230 knots (~115 m/s) and a descent rate of ~1.5 m/s to ~6 m/s. With a typical evaluation period T (—0.5 s), the flying distance L is from ~15 m to ~58 m and the altitude loss $\Delta A$ ($=A_1-A_2$) is from ~0.8 m to ~3 m. Over such a long distance L, any foreign object (e.g. an ILS antenna at location o) located under the approach path will cause a large fluctuation to the distance data. In addition, the large altitude loss $\Delta A$ due to landing will certainly trigger an error. Hence, the LDM is not suitable for precision landing aid.

OBJECTS AND ADVANTAGES

It is a principle object of the present invention to improve passenger comfort at touchdown.

It is a further object of the present invention to help student pilots to learn landing.

It is a further object of the present invention to provide a low-cost precision landing aid.

In accordance with these and other objects of the present invention, a laser landing altimeter for precision aircraft landing aid is disclosed.

SUMMARY OF THE INVENTION

The present invention discloses a precision aircraft landing aid, or more specifically, a laser landing altimeter. It comprises a measurement unit and a processing unit. The measurement unit is similar to that of a traditional laser distance meter (LDM). It measures altitude (A) using a modulated laser beam, e.g. an amplitude-modulated laser beam or a frequency-modulated laser beam. Because the measurement unit only measures altitude when the aircraft is near ground, it may use a low-power laser (e.g. with an average power smaller than or equal to 1 mW). By vastly amplifying the time-of-flight (TOF), the laser landing altimeter can use low-cost components to achieve a single-measurement accuracy of centimeter (cm).

The processing unit of the laser landing altimeter is different from that of the LDM. It does not measure static altitude, but predicts the future altitude of the aircraft. This is done by evaluating the altitude data based on a realistic landing altitude model. Because it only requires ~cm accuracy (not ~mm accuracy as the LDM), the laser landing altimeter uses much fewer altitude data and therefore, its evaluation period is much shorter than the LDM. The laser landing altimeter can achieve a large data acquisition rate. Based on the predicted future altitude, the processing unit determines the landing maneuver time, i.e. the time to initiate a landing maneuver (e.g. flare time or pre-touchdown time). Then a landing maneuver signal is generated in due course.

BRIEF DESCRIPTION OF THE DRAWINGS

FIGS. 8AA-8BB illustrate two preferred gravity-oriented laser landing altimeters.

Figure 1:
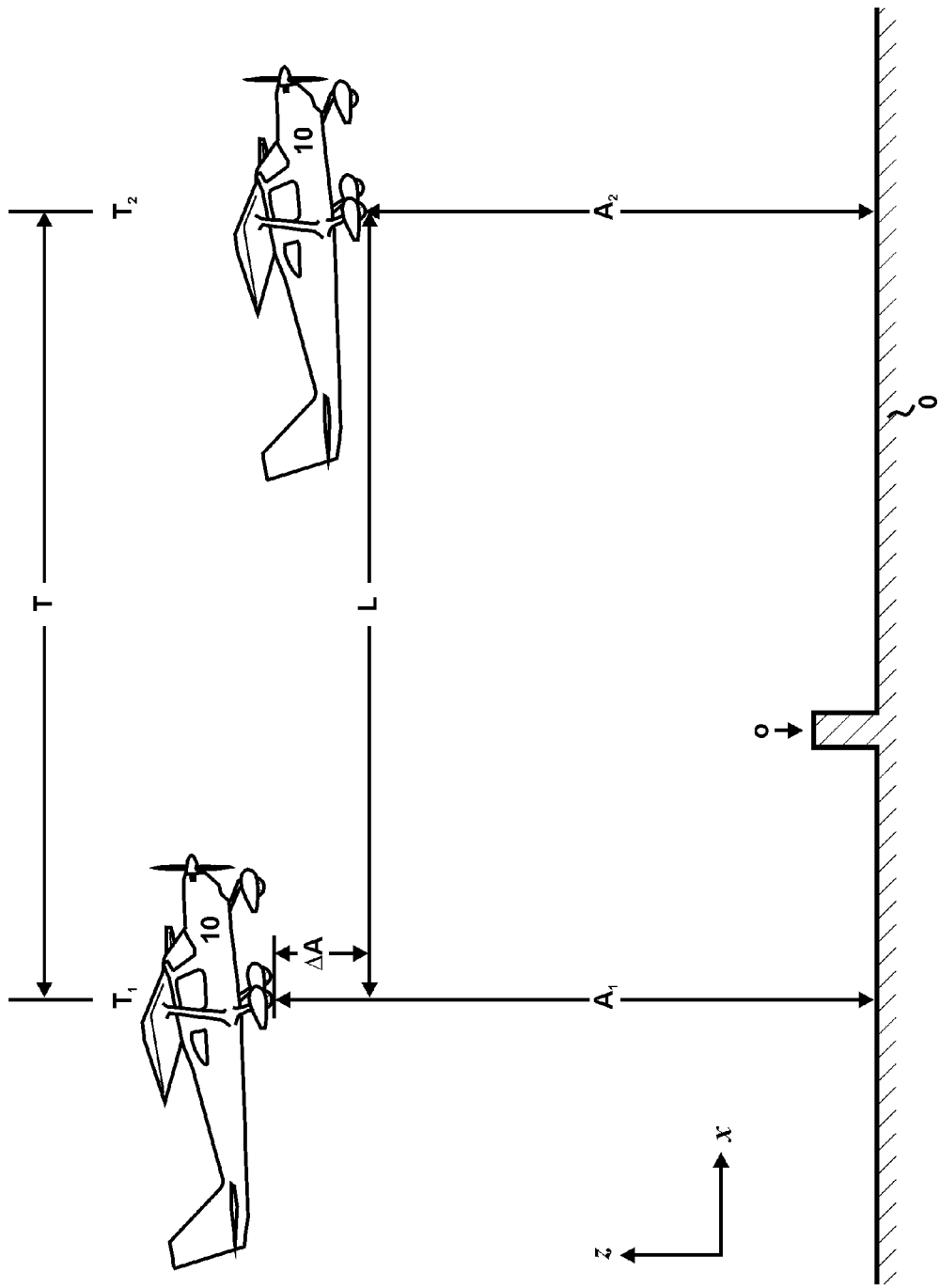
FIG. 1 illustrates the positions of an aircraft at the start of an evaluation period ($T_1$) and at the end of an evaluation period ($T_2$)

It should be noted that all the drawings are schematic and not drawn to scale. Relative dimensions and proportions of parts of the device structures in the figures have been shown exaggerated or reduced in size for the sake of clarity and convenience in the drawings. The same reference symbols are generally used to refer to corresponding or similar features in the different embodiments.

DETAILED DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the present disclosure.

Figure 2:
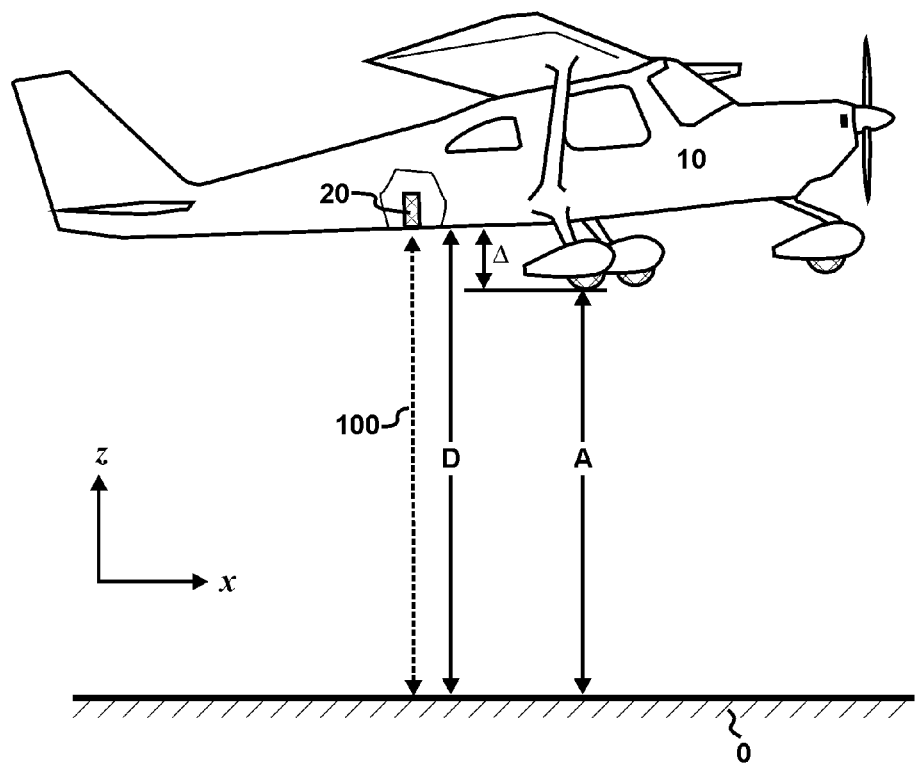
FIG. 2 illustrates an aircraft with a cutaway view of a preferred laser landing altimeter.

Referring now to FIG. 2, an aircraft 10 with a preferred precision landing aid, i.e. a laser landing altimeter 20, is disclosed. The laser landing altimeter 20 is mounted at the bottom of the fuselage. Alternatively, it could also be installed in another part of the aircraft 10, e.g. at the bottom of a wing. The laser landing altimeter 20 measures the distance D to the ground 0 using a laser beam 100 and preferably has a centimeter (cm) accuracy. The altitude A of the aircraft 10 is defined as the distance from the bottom surface of the main landing gear to the ground 0. In a case where the laser beam 100 is perpendicular to the ground 0, the altitude A can be calculated by subtracting an offset Δ from the measured distance D. In a case where the laser beam 100 is not perpendicular to the ground 0, the altitude A can be calculated using simple trigonometry.

Figure 3:
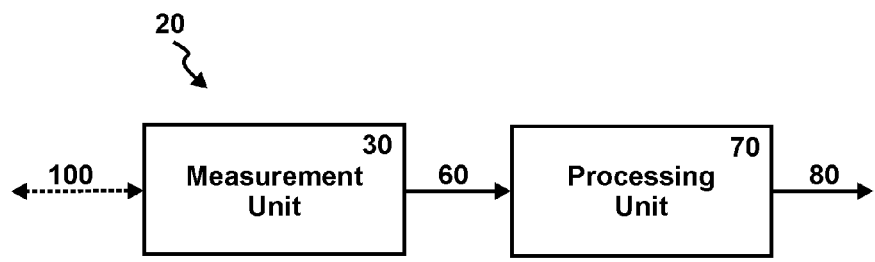
FIG. 3 is a block diagram of a preferred laser landing altimeter.

A block diagram of the preferred laser landing altimeter 20 is disclosed in FIG. 3. It comprises a measurement unit 30 and a processing unit 70. The measurement unit 30 is similar to that of the laser distance meter (LDM). It measures altitude A (or, distance D) using a modulated laser beam 100. Because the measurement unit 30 only measures altitude when the aircraft is near the ground, it may use a low-power laser (e.g. with average power less than or equal to 1 mW), which lowers the overall system cost.

The essence of the modulated-beam distance measurement is to vastly magnify the time-of-flight (TOF). The magnification ratio between time-to-measure (TTM) and TOF could be as large as a few thousand. For example, at a distance of 15 m, TOF is 100 ns, while TTM could be made 1000 times longer, e.g. TTM is 100 μs. Assuming the system clock runs at a moderate rate of 10 MHz and the TTM accuracy is 100 ns, distance D has a single-measurement accuracy of 15 mm. In sum, the modulated-beam distance measurement can achieve a single-measurement accuracy of centimeter (cm) using low-cost components. More details on the measurement unit 30 are disclosed in FIGS. 4A-4B.

The processing unit 70 of the laser landing altimeter is different from that of the LDM. It does not measure static altitude, but predicts the altitude of the aircraft at a future time (i.e. future altitude). This is done by evaluating the altitude data based on a realistic landing altitude model. The landing altitude model could assume a constant descent rate or constant acceleration. It may also take into account of airspeed of the aircraft. Because it only requires ~cm accuracy (not ~mm accuracy as the LDM), the laser landing altimeter uses much fewer altitude data and therefore, its evaluation period is much shorter than the LDM. The laser landing altimeter can achieve a large data acquisition rate. Based on the predicted future altitude, the processing unit determines the landing maneuver time, i.e. the time to initiate a landing maneuver. More details on the data-processing method used by the processing unit 70 are disclosed in FIG. 6.

After obtaining the landing maneuver time, the processing unit 70 generates at least one landing maneuver signal 80 to an autopilot or a human pilot of the aircraft 10. For the autopilot, the processing unit 70 generates the landing maneuver signal 80 at the landing maneuver time. On the other hand, for the human pilot, due to the finite human reaction time, the processing unit 70 typically generates the landing maneuver signal 80 before the landing maneuver time. The landing maneuver signal 80 can be delivered using at least one of visual, audible and haptical means. For example, two seconds before the landing maneuver (e.g. flare or pre-touchdown), two short beeps and a long beep are produced. The pilot is instructed to ready themselves for the maneuver at the first two short beeps and initiate the maneuver at the last long beep.

Figure 4A:
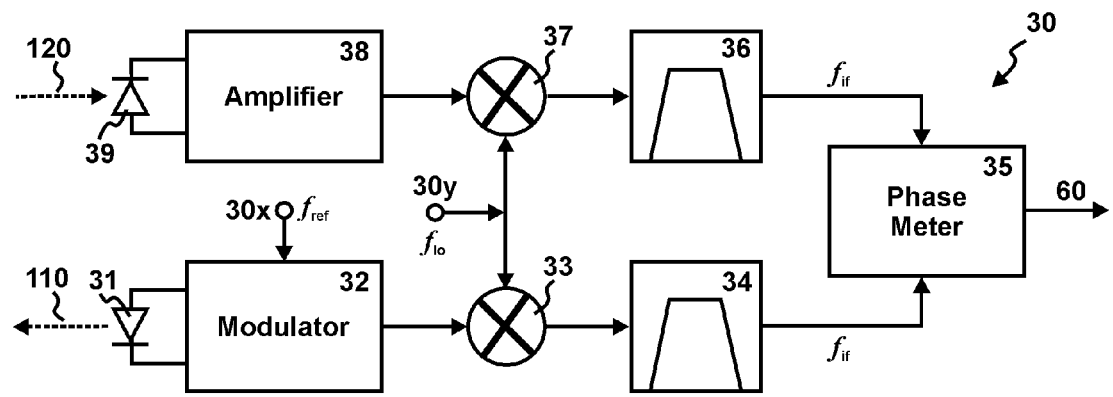
FIGS. 4A-4B are block diagrams of two preferred measurement units.
Figure 4B:
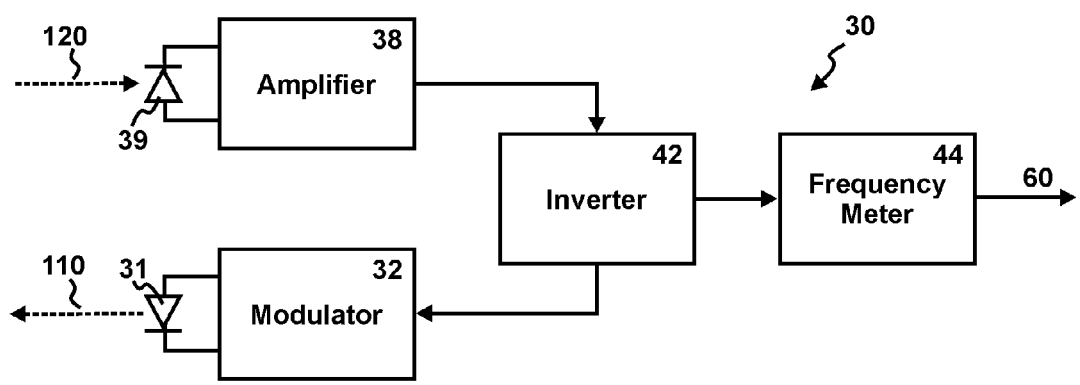

Referring now to FIGS. 4A-4B, two preferred measurement units 30 are disclosed. The preferred embodiment in FIG. 4A uses an amplitude-modulated laser beam and is based on phase-shift measurement. A modulation signal 30x of a reference frequency $f_{ref}$ modulates the amplitude of the source laser beam 110 through a laser diode 31 and a modulator 32. A photo diode 39 converts a portion of the reflected laser beam 120 into photo-electrical current, which is further amplified by an amplifier 38. The distance is deduced from the phase shift between the photo-electric current and the modulation signal 30x. To improve the measurement accuracy, the phase shift is not measured at the working high frequency $f_{ref}$, but at an intermediate frequency $f_{if}=|f_{ref}-f_{lo}|$ using a heterodyne technique that preserves the phase shift. Here, $f_{lo}$ is the frequency of a local oscillator 30y. The signals from two mixers 33, 37 are filtered by two band-pass filters 34, 36. A phase meter 35 measures the phase shift using a relatively slow clock. More details on the phase-shift measurement are disclosed in "Laser ranging: a critical review of usual techniques for distance measurement" by Amann et al., published in Optical Engineering, Vol. 40, No. 1, January 2001, pp. 10-19.

The preferred embodiment of FIG. 4B uses an amplitude-modulated laser beam and is based on the distance-to-frequency conversion principle. The photo-electric signal generated by the photo diode 39 from the reflected laser beam 120 is amplified up to a limited level and inverted by an inverter 42. This inverted signal is directly used to modulate the laser diode 31 through the modulator 32. This configuration forms an oscillator, whose period is the TOF plus the circuit delay. The frequency of this oscillator is then measured by a frequency meter 44 and can be directly converted into distance. More details on the distance-to-frequency conversion principle are disclosed in U.S. Pat. No. 5,309,212 issued to Clark on May 3, 1994. It should be apparent to those skilled in the art that other modulated-beam laser distance measurements can be used, e.g. continuous-wave frequency-modulated (CWFM) laser distance measurement.

Figure 5:
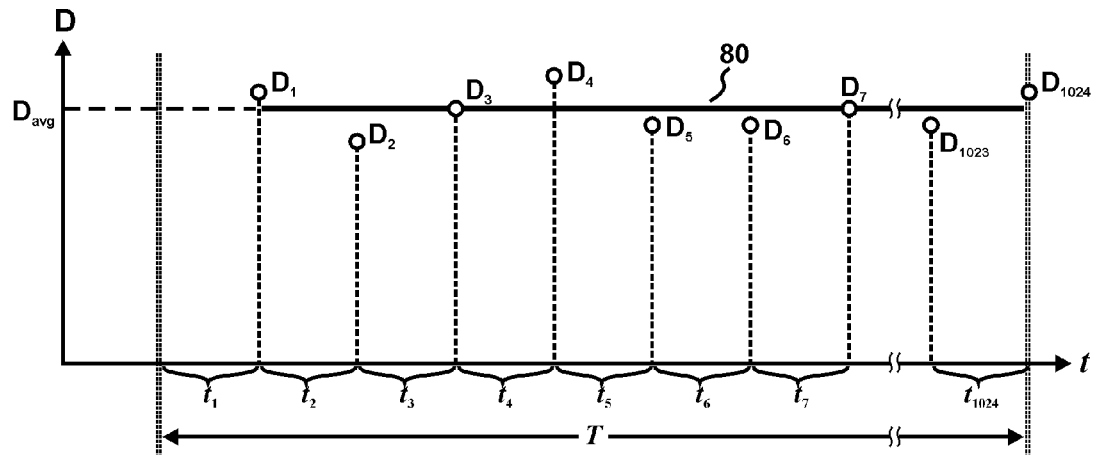
FIG. 5 illustrates a data-processing method used in a processing unit of a traditional laser distance meter (LDM)
Figure 6:
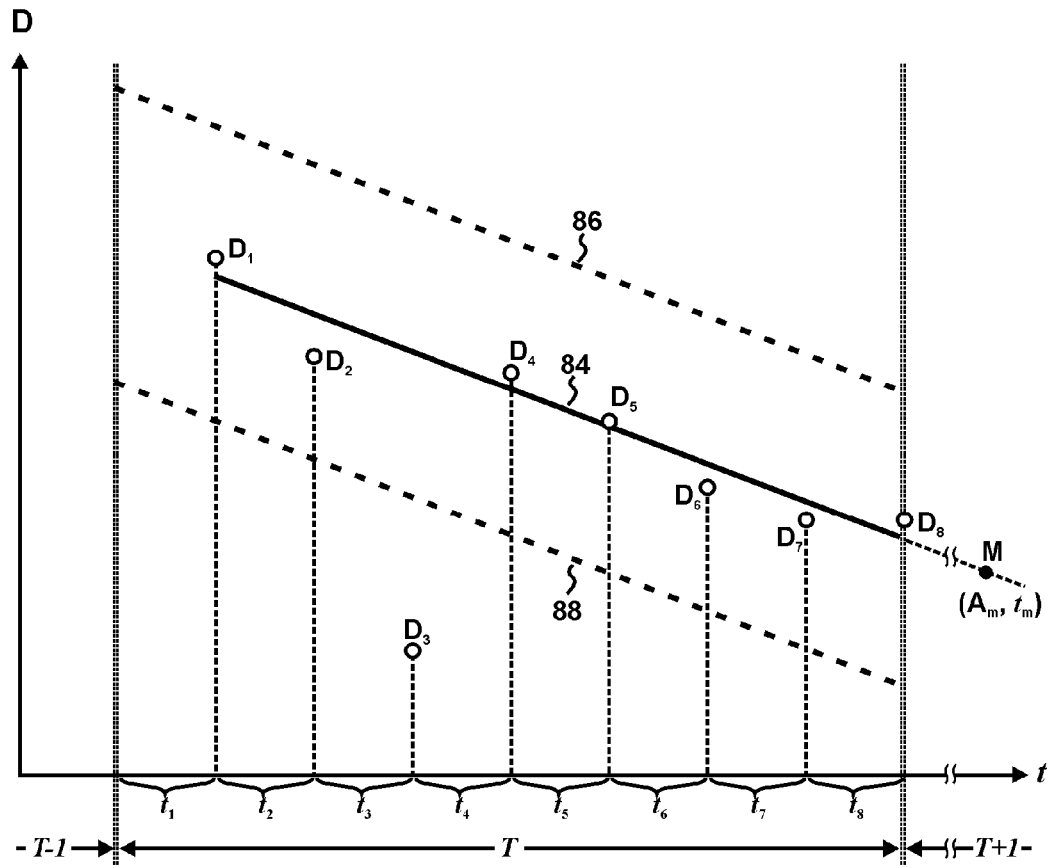
FIG. 6 illustrates a data-processing method used in a processing unit of a preferred laser landing altimeter.

Referring now to FIGS. 5-6, the data-processing methods are compared for a traditional LDM (prior art) and the laser landing altimeter. In both figures, a distance datum (e.g. $D_1$ . . . ) is measured within each measurement period (e.g. $t_1$ . . . ). An evaluation period T consists of n successive measurement periods (e.g. $t_1$, $t_2$ . . . ). At the end of the evaluation period T, all distance data (e.g. $D_1$, $D_2$ . . . ) measured within the evaluation period T are statistically analyzed.

For the LDM of FIG. 5, because it measures static distance, the arithmetic mean of the measured distance data is calculated and used as the average distance $D_{avg}$. To achieve millimeter (mm) accuracy, hundreds to thousands of distance data are averaged and therefore, the evaluation period T consists of hundreds to thousands of measurement periods. In this example, it consists of 1024 measurement periods. Consequently, the LDM has a long evaluation period (~0.1 s to ~7 s). This makes it slow and unsuitable for precision landing aid.

For the laser landing altimeter of FIG. 6, the measured distance data are first filtered. Any distance data (e.g. the distance datum $D_3$) outside the range defined by the upper-bound curve 86 and the lower-bound curve 88 are removed from the distance data set. The filtered distance data are then best-fitted by a curve defined by a realistic landing altitude model. In this example, the landing altitude model assumes the constant descent rate and the distance data are best-fitted by a straight line 84. From this fitted line 84, the estimated distance (e.g. average distance) and the estimated speed (e.g. average speed) within the evaluation period T can be calculated. This fitted line 84 can be further extrapolated in time to predict a future distance (or, altitude). A landing maneuver time $t_M$ is determined when the predicted future altitude reaches a landing maneuver altitude $A_M$. It should be noted that the landing maneuver altitude $A_M$ could depend on descent rate, air speed, pitch angle, and other factors.

Because the laser landing altimeter 20 only requires a centimeter (cm) accuracy, the processing unit 70 could use much fewer distance data for each evaluation. In this example, it only processes eight distance data. This considerably shortens the evaluation period T. As a result, the laser landing altimeter is much more responsive than the LDM. It can achieve a large data acquisition rate.

Figure 7:
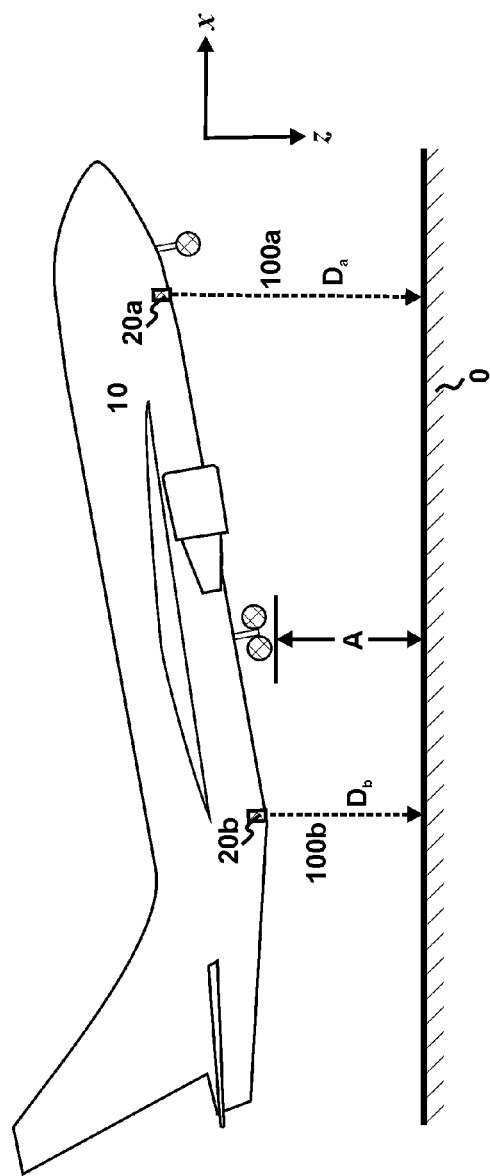
FIG. 7 illustrates an aircraft comprising two laser landing altimeters.

Referring now to FIG. 7, two laser landing altimeters 20a, 20b mounted on the bottom of the fuselage of the aircraft 10. They are located apart along the longitudinal direction X of the aircraft. Here, the laser landing altimeter 20a is installed fore of the aircraft 10, while the laser landing altimeter 20b is installed aft of the aircraft 10. The laser landing altimeters 20a, 20b are preferably gravity-mounted as in FIGS. 8AA-8A, i.e. the laser beams 100a, 100b are both oriented along the direction of gravity (the vertical axis z). From the distances $D_a$, $D_b$ measured by each laser landing altimeter 20a, 20b, both the pitch angle α and the altitude A of the aircraft 10 can be calculated. These parameters can be used to make a better estimate of the landing maneuver time. Another advantage of this preferred embodiment is that it can prevent tail-strike for large aircrafts.

Referring now to FIGS. 8AA-8BB, two preferred gravity-oriented laser landing altimeters are disclosed. The laser beams 100 emitted by these preferred embodiments are always oriented along the direction of gravity during landing. This ensures that the measured distance is perpendicular to the ground and therefore, is altitude. Alternatively, the concept of a gravity-oriented laser landing altimeter can be applied to other electromagnetic-wave (EM-wave, including radio) altimeters, where the EM-wave beam is always oriented along the direction of gravity during landing.

The preferred embodiment in FIGS. 8AA-8AB is a pendulum-like device 13. It is mounted at the bottom 19 of the fuselage and supported by a frame 12. The pendulum-like device 13 comprises a pivot 11 fixedly mounted on the frame, a measurement unit 30 and a weight 14 that can swing around the pivot 11. The weight 14 ensures that the laser beam 100 emitted by the measurement unit 30 is always oriented along the direction of gravity, no matter if the aircraft 10 is in a horizontal position (FIG. 8AA) or has a pitch angle α (FIG. 8AB). The weight 14 preferably contains metallic materials, and forms a pair of dampers with the magnets 15. The dampers help to stabilize the pendulum-like device.

The preferred embodiment of FIGS. 8BA-8BB is a cradle-like device 18. It is mounted on a support 17 by ball bearings 16. The cradle-like device 18 comprises a measurement unit 30 and a weight 14. It can move freely on the support 17. The weight 14 ensures that the laser beam 100 emitted by the measurement unit 30 is always oriented along the direction of gravity, no matter if the aircraft 10 is in a horizontal position (FIG. 8BA) or has a pitch angle α (FIG. 8BB). The weight 14 preferably contains metallic materials, and forms a pair of dampers with the magnets 15. The dampers help to stabilize the cradle-like device.

While illustrative embodiments have been shown and described, it would be apparent to those skilled in the art that more modifications than what have been mentioned above are possible without departing from the inventive concepts set forth therein. For example, although the illustrative embodiments are fixed-wing aircrafts, the invention can be easily extended to rotary-wing aircrafts such as helicopters. Besides manned aircrafts, the present invention can be used in unmanned aerial vehicles (UAV). The invention, therefore, is not to be limited except in the spirit of the appended claims.

What is claimed is:

1. A laser landing altimeter for an aircraft, comprising:
    a measurement unit for successively measuring a plurality of distance data between said aircraft and the ground using a continuous-wave modulated laser beam when said aircraft is near the ground; and
    a processing unit for calculating a future altitude of said aircraft by fitting said plurality of distance data to a landing altitude model.

2. The laser landing altimeter according to claim 1, wherein the measurement period for each of said distance data is substantially longer than the time-of-flight between said aircraft and the ground.

3. The laser landing altimeter according to claim 1, wherein said landing altitude model assumes constant descent rate.

4. The laser landing altimeter according to claim 1, wherein said processing unit further determines a landing maneuver time.

5. The laser landing altimeter according to claim 4, wherein said processing unit calculates a descent rate of said aircraft.

6. The laser landing altimeter according to claim 5, wherein said processing unit determines said landing maneuver time based on said descent rate.

7. The laser landing altimeter according to claim 4, wherein said landing maneuver time is flare time.

8. The laser landing altimeter according to claim 4, wherein said landing maneuver time is pre-touchdown time.

9. The laser landing altimeter according to claim 4, wherein a landing maneuver signal is output to an autopilot of said aircraft at said landing maneuver time.

10. The laser landing altimeter according to claim 4, wherein a landing maneuver signal is output to a human pilot of said aircraft before said landing maneuver time.

11. The laser landing altimeter according to claim 10, wherein said landing maneuver signal is output to said human pilot using at least one of visual, audible and haptical means.

12. The laser landing altimeter according to claim 1, further comprising another measurement unit located apart from said measurement unit along the longitudinal direction of said aircraft.

13. The laser landing altimeter according to claim 1, wherein said laser beam is oriented in a same direction during the measurement of said plurality of distance data.

14. The laser landing altimeter according to claim 13, further comprising an orientation unit for constantly orienting said laser beam in a fixed direction with respect to the ground.

15. A landing-aid apparatus for an aircraft, comprising:
 a measurement unit for successively measuring a plurality of distance data between said aircraft and the ground using an electromagnetic-wave (EM-wave) beam when said aircraft is near the ground; and
 orientation unit for constantly orienting said EM-wave beam in a fixed direction with respect to the ground and without regard to the orientation of said aircraft.

16. The apparatus according to claim 15, where said orientation unit is a pendulum-like device.

17. The apparatus according to claim 15, where said orientation unit is a cradle-like device.

18. The apparatus according to claim 15, where said EM-wave beam is a laser beam.

19. The apparatus according to claim 15, where said EM-wave beam is a microwave beam.

20. The apparatus according to claim 15, where said EM-wave beam is a radio beam.

\* \* \* \* \*